July 20, 1943.  B. WANDEL  2,324,658
ADAPTER FOR NON-REWIND EXPANSIBLE FILM REELS
Filed Aug. 6, 1941  2 Sheets-Sheet 1
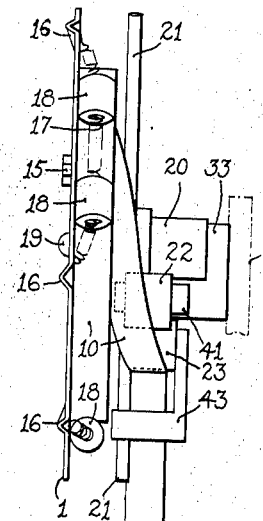
Fig. 2
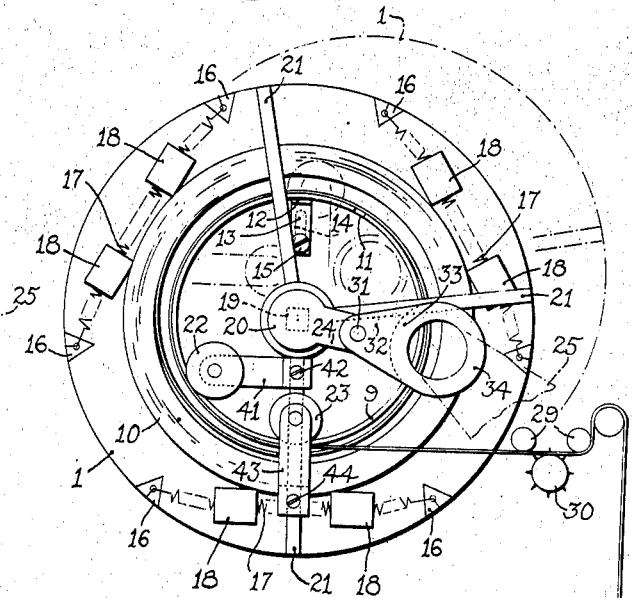
Fig. 1
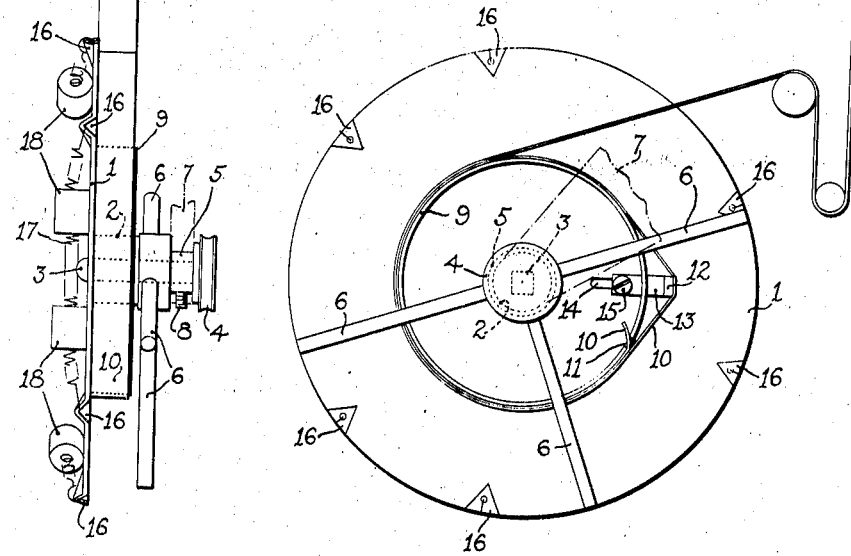
Inventor
Barney Wandel
by Charles E. Ruby
his Attorney

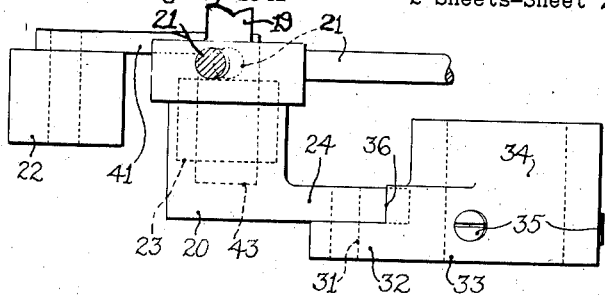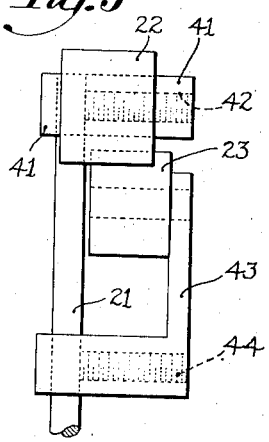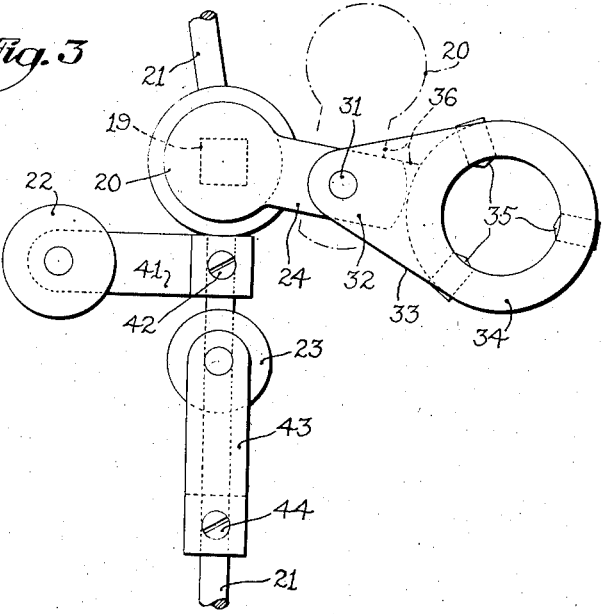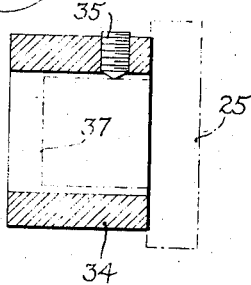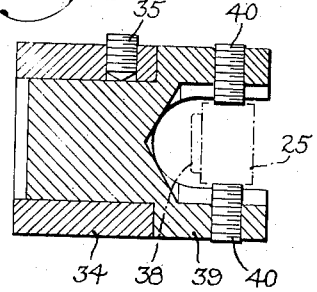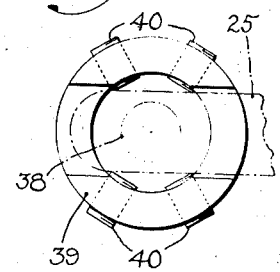

Patented July 20, 1943

2,324,658

UNITED STATES PATENT OFFICE 2,324,658

ADAPTER FOR NONREWIND EXPANSIBLE FILM REELS

Barney Wandel, Boston, Mass., assignor to No Rewind Reel Corp., a corporation of Massachusetts Application August 6, 1941, Serial No. 405,591

4 Claims. (Cl. 88—18.7)

The present invention pertains generally to motion picture projecting machines and specifically to devices accessory to the use and operation of reels for motion picture projecting machines, by the use and operation of which reels the necessity of rewinding the film between successive showings thereof is obviated.

As is well known in the art, the method presently employed in the showing of non-continuous films, i. e., films whose ends are not united to form continuous bands, consists of drawing the film from the reel upon which it has been wound, passing the film past the lens of the projector, and winding the film upon a second reel, the outer end of the film when on the feeding reel becoming the inner end of the film when on the winding reel, thereby necessitating the rewinding of the film before the film can be shown in proper sequence subsequently. This method of operation is unsatisfactory because of the time consumed in the rewinding operations and because of the wear and tear and the breakages of the film incurred in and by the double handling thereof. Therefore I devised a non-rewind expansible film reel upon which the film can be wound and from which the film can be fed in the succeeding showing of the film without rewinding the film upon another reel, together with devices accessory to its use and operation, for which I have made application for patent on May 21, 1940, Serial No. 336,373.

The principal object of the present invention is to provide an improved adapter for the non-rewind expansible film reels by the use of which the non-rewind expansible film reels can be utilized in connection with a variety of motion picture projecting machines differing from one another in construction.

Another object of the present invention is to provide an improved adapter for the non-rewind expansible film reels which will greatly facilitate their use and operation generally.

The attainment of these and other objects of the present invention and the advantages attendant upon the use and operation of the present invention will become apparent when consideration is given to the following description thereof, together with the accompanying drawings thereof, which form a part of the specification and wherein:

Fig. 1 is a diagrammatic side elevation of a motion picture projecting machine showing side elevations of two of the non-rewind expansible film reels, the upper one in the feeding position and mounted upon the improved adapter for the non-rewind expansible film reels, a side elevation of which is shown, and the lower one in the winding position.

Fig. 2 is a front elevation of the two non-rewind expansible film reels in the mutual relation shown in Fig. 1 and of the improved adapter for the non-rewind expansible film reels carrying the film-guiding devices accessory to the use and operation of the non-rewind expansible film reels.

Fig. 3 is a side elevation of the improved adapter for the non-rewind expansible film reels showing the film-guiding devices carried thereby.

Fig. 4 is a plan view of the improved adapter for the non-rewind expansible film reels showing the film-guiding devices carried thereby.

Fig. 5 is a front elevation of the film-guiding devices carried by the improved adapter for the non-rewind expansible film reels.

Fig. 6 is a sectional view of that portion of the improved adapter for the non-rewind expansible film reels whereby the improved adapter for the non-rewind expansible film reels is secured to the frames of certain types of motion picture projecting machines.

Fig. 7 is a side elevation of an ancillary element employed in securing the improved adapter for the non-rewind expansible film reels to the frames of other types of motion picture projecting machines, and Fig. 8 is a sectional view of the assembly of the ancillary element shown in Fig. 7 and of that portion of the improved adapter for the non-rewind expansible film reels shown in Fig. 6, showing the manner of securing the improved adapter for the non-rewind expansible film reels to the frames of types of motion picture projecting machines to which the improved adapter for the non-rewind expansible film reels cannot be secured directly.

In the drawings, 1 designates a circular plate to which is secured, at its center, a suitable hub 2. The plate 1 and the hub 2 are keyed for the reception of the axle 3 of the winding mechanism of the motion picture projecting machine and the idling axle 19 of the feeding mechanism of the motion picture projecting machine.

Substantially concentric with the hub 2 and secured to the plate 1 is the ring 9, which constitutes, in large measure, the film-receiving element upon which the film 10 is wound, and which is in width slightly greater than is the width of the film 10 and is adapted to receive and to retain the starting end of the film 10 by being provided with the incision 11 formed therein which substantially traverses the width of the ring 9.

At one or more points on the periphery of the ring 9, there is removed therefrom a portion, in length not necessarily, but if desired, as great as is the width of the ring 9, but, in all cases, substantially as great as is the width of the film 10 to be wound upon the ring 9. For these removed portions of the ring 9 are substituted the upright portions 12 of small angle pieces, the horizontal portions 13 of which are keyed to fit into, and to be movable in, the slots 14, radially disposed in the plate 1. By means of bolt-washer-locknut ensembles 15, the angle pieces may be adjusted to, and maintained in, desired positions relative to the slots 14, thereby providing an expansible film-receiving element.

At a plurality of positions on the periphery of the plate 1, the plate 1 is provided with V-shaped indentations 16, which are pierced with centered holes. Secured in, and stretched between, holes in sequential indentations are the tensional springs 17, each bearing one or more rubber shields 18: the tensional springs 17 bearing the rubber shields 18 can be disposed upon either side of the plate 1.

When the non-rewind expansible film reel is in the winding position, it is mounted upon the axle 3 of the driving mechanism of the motion picture projecting machine. The axle 3 carries also the driving pulley 4 and is rotatable in the ball-bearing-containing casing 5, which carries the three-prong spider 6 and which is inset into the portion 7 of the motion picture projecting machine and retained therein by the set screw 8.

When the non-rewind expansible film reel is in the feeding position, it is mounted upon the idling axle 19, rotatable in the ball-bearing-containing casing 20, which carries the three-prong spider 21, the pulley 22 mounted upon ball-bearings, and the second pulley 23 mounted upon ball-bearings, and which is provided with the short arm 24, which is secured, at a point intermediate its length and by the pin 31, to one end of the short arm 32 of the member 33, which, in turn, is secured, directly or indirectly, to the frame 25 of the motion picture projecting machine.

By reference to Figs. 3 and 4, it will be seen that the member 33 consists of a collar or sleeve 34 provided with a plurality of set screws 35 and with the short arm 32, united to the short arm 24 by means of the pin 31, and with the abutment 36 overhanging and engaging the end of the short arm 24 when the short arm 24 is in an almost horizontal position: in fact, it is by the means of the short arm 32, the pin 31, and the abutment 36 that the short arm 24 is maintained in an almost horizontal position. By reference to Fig. 3, it will be seen that the ball-bearing-containing casing 20, carrying the idling axle 19, the three-prong spider 21, the pulley 22 mounted upon ball-bearings, and the second pulley 23 mounted upon ball-bearings, can be rotated clockwise through substantially 90°, its rotation being delimited by contacts made between the short arm 24 and the under face and the outer end of the abutment 36, which thus serves doubly as a stop means.

By reference to Fig. 6, it will be seen that when, as is not unusually the case, the motion picture projecting machine is provided with a collar 37 of not unsubstantial length for the housing of the bearing of an idling axle (which may be dismantled when the non-rewind expansible film reels and the improved adapter for the non-rewind expansible film reels are being used), the collar or sleeve 34 of the improved adapter for the non-rewind expansible film reels can be secured directly to the motion picture projecting machine, i. e., to the collar 37, by the set screws 35. In the newer types of motion picture projecting machines, the lengths of such collars 38 may be insufficient to permit the employment of this mode of attachment of the improved adapter for the non-rewind expansible film reels to such motion picture projecting machines, so the means of attachment of the improved adapter for the non-rewind expansible film reels to such motion picture projecting machines, shown in Figs. 7 and 8, are employed. These means of attachment of the improved adapter for the non-rewind expansible film reels to such motion picture projecting machines comprise a reducing nipple 39, the wide portion of which is slotted transversely and longitudinally and is provided, in its unslotted portions, with a plurality of set screws 40, directed radially inward, to engage directly the arm 25 of such motion picture projecting machine, while the narrow portion of the reducing nipple 39 is itself encircled by, and engaged by the set screws 35 of, the sleeve or collar 34 of the improved adapter for the non-rewind expansible film reels. Thus, the improved adapter for the non-rewind expansible film reels can be attached to the motion picture projecting machines in and by the one or the other of these modes of attachment.

By reference to Fig. 2, it will be seen that the non-rewind expansible film reel in the feeding position is not in alignment with the non-rewind expansible film reel in the winding position, but is parallel thereto and offset therefrom by an amount somewhat greater than the width of the film used in the motion picture projecting machine. The film 10 is shown as passing from the non-rewind expansible film reel in the feeding position, over the pulley 22 mounted upon ball-bearings and carried by the arm 41, secured to a prong of the three-prong spider 21 by the set screw 42, over the second pulley 23 mounted upon ball-bearings and carried by the L-shaped arm 43, secured to a prong of the three-prong spider 21 by the set screw 44, between the rollers 29 and the film-feeding sprocket 30, to become wound upon the non-rewind expansible film reel in the winding position.

The use of, and the results realizable by the use of, the non-rewind expansible film reels and the improved adapter for the non-rewind expansible film reels can best be appreciated by recounting the procedure of winding the film upon the non-rewind expansible film reel in the winding position, transferring from the winding position to the feeding position the non-rewind expansible film reel carrying the film wound thereupon, and feeding the film from the non-rewind expansible film reel while it is in the feeding position. In pursuance of this plan, the following steps are taken: the empty non-rewind expansible film reel is installed in the winding position, the angle pieces (but one is shown in the drawings of the non-rewind expansible film reel) are advanced outwardly, so that the outer surfaces of their upright portions 12 are at greater distances from the center of the plate 1 than are the elements of the outer surface of the ring 9, and the tensioned springs 17, bearing their rubber shields 18, are disposed upon the rear face of the plate 1. The starting end of the film 10 is then threaded into the incision 11 in the ring 9 and the driving mechanism of the motion picture projecting machine is then actuated, whereupon the film 10 is wound upon the ring 9 and the upright portions 12 of the outwardly advanced angle pieces of the non-rewind expansible film reel in the winding position, forming a distorted spiral, all of the loops of which are in length substantially greater than is the circumference of the ring 9. When the film 10 has been completely wound onto the non-rewind expansible film reel in the winding position, the tensional springs 17, bearing their rubber shields 18, are then snapped over the periphery of the plate 1, and the rubber shields 18 are allowed to make contact with the outer layer of the film 10 wound upon the non-rewind expansible film reel, and to exert upon the spiral of wound film 10 slight radially directed pressures resulting from the displacements of the tensional springs 17 from straight-line positions between holes in sequential V-shaped indentations 16 at the periphery of the plate 1. The non-rewind expansible film reel, carrying the spiral of wound film 10 retained between the ring 9 and upright portions 12 of outwardly advanced angle pieces and the tensional springs 17, bearing their rubber shields 18 contacting the outer layer of the spiral of wound film 10, is then installed in the feeding position of the moving picture projecting machine provided with the improved adapter for the non-rewind expansible film reels, i. e., it is mounted upon the idling axle 19 of the improved adapter for the non-rewind expansible film reels: the positions of the tensional springs 17 and their rubber shields 18 and the engagement of the rubber shields 18 with the outer layer of the spiral of wound film 10 are shown in the upper portion of Fig. 1. If now the angle pieces of the non-rewind expansible film reel are retracted inwardly, the spiral of wound film 10 floats, being held disposed substantially concentrically about the ring 9 by the tensional springs 17 and their rubber shields 18. The non-rewind expansible film reel is now temporarily displaced from its normal feeding position by the rotation, upon the pin 31 and through 90°, of the arm 24 of the ball-bearing-containing casing which carries the idling axle 19 rotatable therein, the three-prong spider 21, the pulley 22 mounted upon ball bearings, and the second pulley 23 mounted upon ball-bearings, into the positions shown by dot-and-dash lines in Figs. 1 and 3. The inner, or starting, end of the film 10 is removed from the incision 11 in the ring 9, is passed over the pulley 22 mounted upon ball-bearings, is passed over the second pulley 23 mounted upon ball-bearings and between its L-shaped arm 43 and the prong of the three-prong spider 21 to which the L-shaped arm 43 is secured, is inserted between the rollers 29 and the film-feeding sprocket 30, is passed through the film-gate (not shown) and past the lens of the motion picture projecting machine, and is finally threaded into the incision 11 of the ring 9 of a non-rewind expansible film reel in the winding position, of which the angle pieces have been advanced outwardly and the tensional springs 17, bearing their rubber shields 18, have been disposed upon the rear face of the plate 1. When these operations have been concluded, the non-rewind expansible film reel, carrying the spiral of wound film 10 retained between the tensional springs 17 and their rubber shields 18, is then returned to its normal feeding position by the rotation, upon the pin 31 and through 90° in the reverse direction, of the arm 24 of the ball-bearing-containing casing which carries the idling axle 19 rotatable therein, the three-prong spider 21, the pulley 22 mounted upon ball-bearings, and the second pulley 23 mounted upon ball-bearings. Now, as the driving mechanism of the motion picture projecting machine winds the film 10 onto the non-rewind expansible film reel in the winding position, the film 10 feeds smoothly from the inner portion of the floating spiral of wound film. Throughout the feeding of the film 10, never more than two turns of the film 10 become sensibly detached from the body of the floating spiral of wound film 10, and these two turns of the film 10 tend to hug the outer surface of the ring 9 of the non-rewind expansible film reel in the feeding position, thereby providing sufficient frictional engagement with the ring 9 to rotate, at the proper speed, the non-rewind expansible film reel from which the film 10 is being fed. Emphasis is to be accorded to the statement, based upon repeated observations, that at no time during the feeding of the film 10 from the inner portion of the floating spiral of wound film 10 does the spiral of wound film 10 collapse, nor does the spiral of wound film 10 tend to become unwound. It is conceivable that the results realizable by the use of the non-rewind expansible film reel might be less desirable were the radius of the ring 9 quite small, or were the moment of inertia of the non-rewind expansible film reel quite large; but, with the use of rings 9 of moderate diameters, and with the use, for the construction of the non-rewind expansible film reels, of materials as light as, or lighter than, the materials usually employed in the construction of reels for motion picture projecting machines, the results realizable by the use of the non-rewind expansible film reels have been eminently satisfactory.

The purposes of the devices accessory to the non-rewind expansible film reels are obvious: the film 10, issuing from the inner portion of the floating spiral of wound film 10, must needs be fed to a non-rewind expansible film reel offset with respect to the non-rewind expansible film reel carrying the floating spiral of wound film 10; and this feeding, involving as it does a corresponding offsetting of the film 10, is accomplished by the use of the pulley 22 mounted upon ball-bearings and the second pulley 23 mounted upon ball-bearings, which, with its L-shaped arm 43 and the prong of the three-prong spider 21 to which the L-shaped arm 43 is secured, serves as a film-guide: the two three-prong spiders 21 and 6 insure at all times the correct guidance of the film 10 with respect to the non-rewind expansible film reels.

The purposes of the improved adapter for the non-rewind expansible film reels have already been stated, but it will not be too redundant to remark that the displaceability, by rotation, from its normal feeding position, of the non-rewind expansible film reel, carrying the spiral of wound film 10 retained between the tensional springs 17 and their rubber shields 18, rendered possible by the use of the improved adapter for the non-rewind expansible film reels, enhances markedly the ease of using the non-rewind expansible film reels.

It is obvious that many modifications in the construction of the improved adapter for the non-rewind expansible film reels can be effected without departing from the spirit and scope of the present invention. In particular, it is obvious that displacement, by rotation, of a portion of the improved adapter for the non-rewind expansible film reels, of the non-rewind expansible film reel from the normal feeding position in a motion picture projecting machine, and attachment, to various types of motion picture projecting machines, of the improved adapter for the non-rewind expansible film reels can be realized by the use of many forms of construction other than the simple forms of construction disclosed. But whatever may be the forms of construction used in substitution for the forms of construction disclosed, the present invention is to be limited only by the scope of the appended claims.

Having disclosed my invention, what I claim is:

1. An adapter for non-rewind expansible film reels comprising, in combination, a casing housing an idling axle and provided with an arm, a collar provided with set screws, an abutment, and an arm and a pin uniting the arm of the casing at a point intermediate its length and the arm of the collar at its ends and serving as a pivot upon which the arm of the casing can be rotated until it makes contact with the abutment of the collar at both ends of the arc of its rotation.

2. An adapter for non-rewind expansible film reels comprising, in combination, a casing housing an idling axle, a collar provided with set screws and secured to the said casing, and a reducing nipple the wide portion of which is slotted transversely and longitudinally and is provided with set screws and the narrow portion of which is encircleable by the said collar and is engageable by its set screws.

3. In an adapter for non-rewind expansible film reels, a multi-prong spider, an L-shaped arm mounted upon one of the prongs of the multi-prong spider, and a pulley carried by the L-shaped arm, the L-shaped arm, the prong of the multi-prong spider to which it is secured, and the pulley carried by the L-shaped arm, in combination, forming a film-guide.

4. An adapter for non-rewind expansible film reels comprising, in combination, a casing housing an idling axle and provided with an arm, a collar provided with set screws, an abutment, and an arm and a pin uniting the arm of the casing at a point substantially midway of its length and the arm of the collar at its end and serving as a pivot upon which the arm of the casing can be rotated until its upper half makes contact with the abutment of the collar at one end of the arc of its rotation and its lower half makes contact with the abutment of the collar at the other end of its arc of rotation.

BARNEY WANDEL.